United States Patent [19]

Matsumoto

[11] 3,967,769
[45] July 6, 1976

[54] TAPE DRIVING ASSEMBLY
[75] Inventor: Isao Matsumoto, Tokyo, Japan
[73] Assignee: Sony Corporation, Tokyo, Japan
[22] Filed: Dec. 9, 1974
[21] Appl. No.: 530,801

[30] Foreign Application Priority Data
Dec. 22, 1973 Japan.................. 48-1570[U]

[52] U.S. Cl. ............................................. 226/194
[51] Int. Cl.² ............................................ B65H 17/20
[58] Field of Search ........... 226/181, 190, 194, 168,
226/186, 187, 89, 90; 242/194, 197, 198;
360/92, 93

[56] References Cited
UNITED STATES PATENTS

| | | | |
|---|---|---|---|
| 3,462,057 | 8/1969 | Yamamoto | 226/181 |
| 3,581,966 | 6/1971 | Huber | 226/194 |
| 3,734,373 | 5/1973 | Dattilo | 226/190 |
| 3,790,055 | 2/1974 | Sims, Jr. | 226/181 |
| 3,921,881 | 11/1975 | Dattilo | 226/194 |

Primary Examiner—Allen N. Knowles
Attorney, Agent, or Firm—Hill, Gross, Simpson, Van Santen, Steadman, Chiara & Simpson

[57] ABSTRACT

A tape driving assembly for use in a mini-cassette which includes a capstan holder having a capstan bearing and a capstan cover which prevents tape from becoming entangled on the capstan and further provides a second bearing support for the capstan so it is not deflected by side pressure from a pinch roller and further which provides a pair of reference surfaces so as to accurately and positively position the cassette relative to the capstan, the pinch roller and the magnetic head.

10 Claims, 12 Drawing Figures

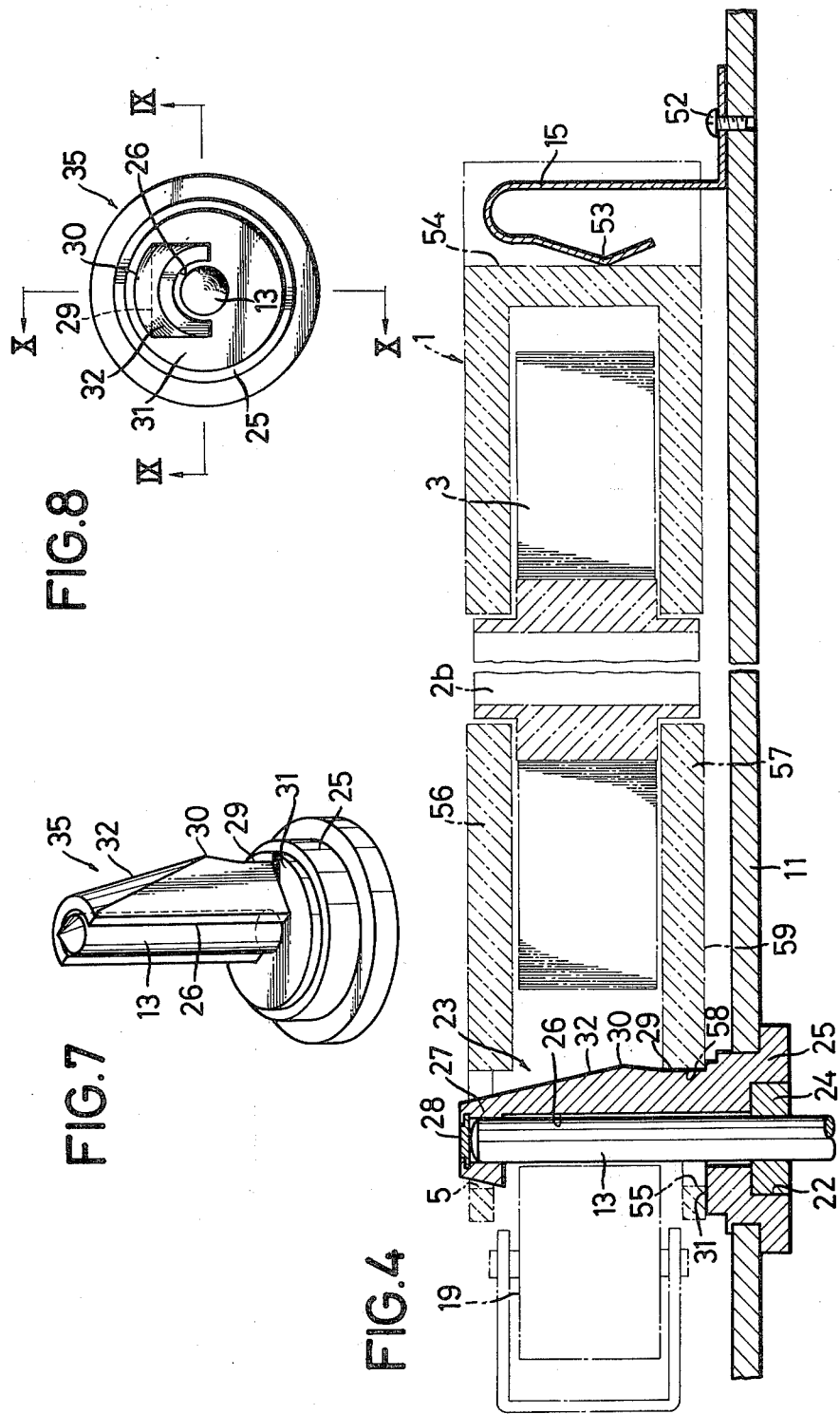

TAPE DRIVING ASSEMBLY

BACKGROUND OF THE INVENTION

1. Field of the Invention

This invention relates in general to tape recorders, and in particular to an improved tape driving assembly which further provides positioning means or spacing index means for a cassette.

2. Description of the Prior Art

In conventional cassettes or tape recorders, the tape sometimes becomes wrapped or wound about the capstan shaft accidentally during playback, recording, fast forward and fast rewinding modes. This is particularly true during conditions of high humidity and such winding or wrapping of the magnetic tape about the cassette cuts and injures the tape rendering it unusable.

SUMMARY OF THE INVENTION

The present invention provides a capstan cover or holder which partially surrounds and covers the capstan so as to separate the tape from the capstan and prevent accidental winding and wrapping of the tape about the capstan and further the capstan cover or holder includes a pair of referencing surfaces at right angles to each other for indexing the cassette relative to the capstan and the magnetic head so as to accurately position the cassette. A rear portion of the holder or cover of the capstan provides a reference against which the cassette is biased and a generally horizontal surface is provided as a vertical reference and the bottom surface of the cassette rests against such reference surface so as to be accurately indexed or positioned in a vertical direction relative to the capstan and the other portions of the tape recorder machine.

The capstan holder or cover serves as indexing means for the cassette and thus eliminates the need for guide pins which are conventional in larger model tape cassettes. This reduces the possible size of the mini-cassettes and also provides a more accurate position reference for the cassette.

The space references accurately position the casette at the predetermined location relative to the level and position of the magnetic head and further provides stabilization of the transport of the tape, thus assuring that the head will track accurately relative to the signal recorded track on the tape.

The capstan cover or holder supports the capstan at two points, one of which is a radial bearing table, and the other of which is a radial bearing portion integrally formed with the cover or holder, thus assuring that the capstan is not deflected by the spring bias pinch roller during operation, since the pair of bearings balance the force of the pinch roller.

In certain embodiments, the capstan holder or cover has a projection over which the cassette is pushed so as to lock the cassette in the vertical reference position. Such projection locks the cassette to the tape machine and prevents the cassette from floating on the flange table as the tape is wound or rewound particularly at high speeds in the fast forward or rewind modes.

The projection for locking the cassette on the flange table does not prevent the cassette from being easily placed onto the machine or removed therefrom.

In some type of tape machines, the capstan may rotate when the power switch is turned on even when the machine is not in the play or record mode, and the present invention assures that the tape will be protected even if the cassette is placed onto the reel shafts while the capstan is rotating.

Since space conservation is very important in miniature tape machines, the present capstan holder or cover does not project above the top wall of the cassette, which allows the design of a very compact tape machine and which allows the machine to be very thin.

The total number of parts is substantially decreased because the cover or member for the capstan serves as a protective cover as well as provides the position reference for the cassette.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure and in which:

BRIEF DESCRIPTION OF THE DRAWINGS

FIG. 4 is a sectional view taken through the capstan cover and the cassette;

FIG. 7 is an enlarged perspective view of a modification of the invention;

FIG. 8 is a top plan view of the modification illustrated in FIG. 7;

DESCRIPTION OF THE PREFERRED EMBODIMENTS

Figure 1:
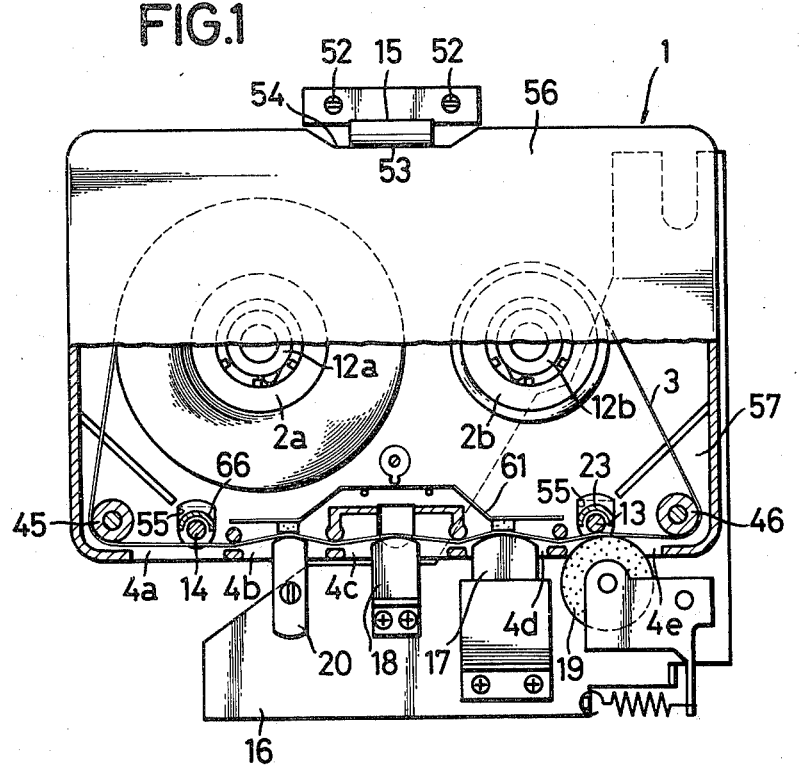
FIG. 1 is a top plan view illustrating the invention.

FIGS. 1 through 7 illustrate a first embodiment of the invention in which a mini tape cassette 1 has a top cover 56 and a bottom cover 57 and is formed with a rear notch 54 in its back wall and rotatably supports a pair of reel hubs 2a and 2b through which reel shafts 12a and 12b are receivable.

As best shown in FIG. 1, the cassette 1 has tape 3 which passes from one reel hub 2a over first idler roller 45 and then past a guide pin 14. The tape passes from the guide pin 14 by wiper arm support 61, which carries tape wiping means at opposite ends thereof, and past a tape guide 20 which is received in an opening 4b of the cassette. Erase head 18 is mounted on a head chassis 16 so as to be received in an opening 4c of the cassette and a play/record head 17 is received in an opening 4d of the front of the cassette and the tape 3 passes thereby. The pinch roller 19 is receivable in an opening 4e of the front face of the cassette and engages the tape 3 and presses it against a capstan shaft 13. The tape passes from the pinch roller and capstan 13 past a second idler roller 46 to the reel hub 2b.

The guide pin 14 is surrounded on the side away from the tape 3 with a crescent shaped member 66 so as to prevent the tape from winding around the guide pin and becoming entangled thereon.

The capstan shaft 13 is surrounded by a capstan cover or holder 23 which is seen in greater detail in FIGS. 2 through 6.

A supporting plate 11 of the main chassis of the tape machine supports a flange table 25 which is attached to the main chassis plate 11 and the capstan drive shaft 13 extends through the flange table member 25 and extends through a radial bearing table 24 mounted in a depression 22 formed therein. A capstan cover or holder member 23 extends up from the flange table member 25 and has an upper cylindrical portion 27 in which a thrust bearing 28 is mounted, and the upper end of the capstan shaft 13 is rotatably supported in the cylindrical member 27 and the bearing 28.

The capstan cover or holder is open on the tape engaging side of the capstan so that the pinch roller 19 can be pressed to the capstan 13, but surrounds the capstan approximately 180° on the side away from the tape and pinch roller 19.

The upper portion of the capstan cover and holder 23 is formed with a tapered portion 32 so as to provide a guide for the cassette 1 as it is placed on the machine, and the opening 55 in the cassette bottom wall 57 passes over the tapered portion 32 and over a projection or bulge 30 which extends a greater distance from the center of the capstan shaft 13 than a lower portion 29 so as to assure proper setting of the lower surface 59 of the bottom plate 57 of the cassette 1. The upper end of the capstan shaft 13 and the upper end including the cylindrical portion 27 and bearing 28 pass through the upper opening 5 of the upper wall 56 of the cassette 1.

A flat reference surface 31 is formed on the upper surface of the flange table 25 and the lower surface 59 of the wall 57 of the cassette 1 engages the surface 31, which provides as a vertical reference therefor. The surface 29 which is at right angles to the surface 31, engages the surface 58 of the wall 57 of the cassette 1, and a rear spring 15, which is attached to the main chassis wall 11 by screws 52, has a cassette engaging portion 53 which pushes the cassette 1 to the left relative to FIG. 4, such that the surface 58 of the cassette is in firm engagement with the surface 29 of the capstan cover 23 and such that the lower surface 59 of the cassette wall 57 is in engagement with the horizontal reference surface 31, as shown in FIG. 4.

A cover member 66 extends around the guide pin 14 and has a general configuration of the capstan holder or cover 23 and is provided with the vertical reference surface 29 and a horizontal reference surface 31. Thus, when the cassette 1 is mounted on the tape machine, the tape cassette 1 is firmly held and referenced to the surfaces 29 on the cover members 23 and 66, as well as the vertical reference surface 31 on the cover members 23 and 66.

Figure 2:
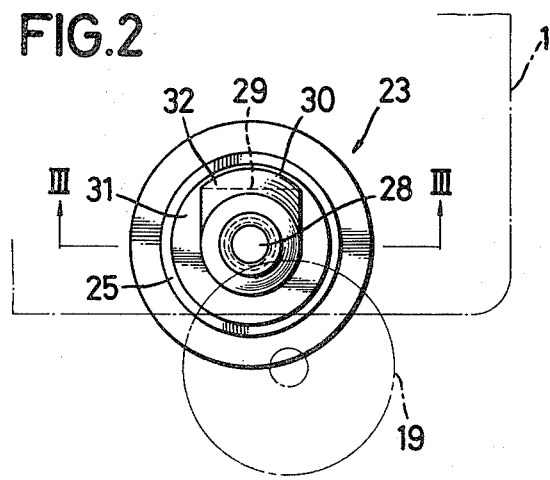
FIG. 2 is an enlarged top detailed view of the capstan holder or cover.
Figure 3:
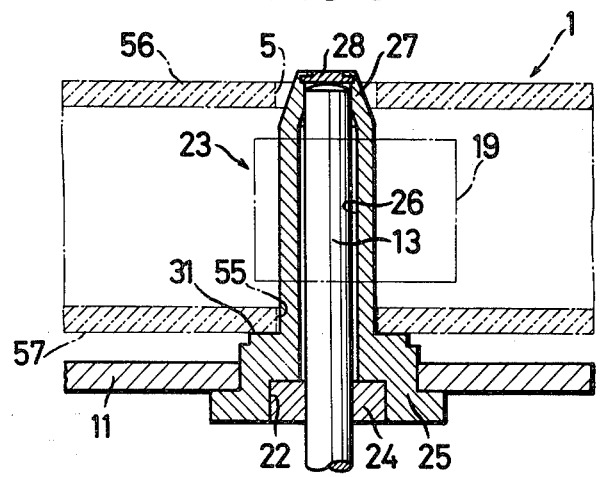
FIG. 3 is an enlarged sectional view taken on a line III—III of FIG. 2.

FIG. 2 is a top view illustrating the cover or holder member 23, and FIG. 3 is a sectional view taken on line III — III of FIG. 2.

Figure 5:
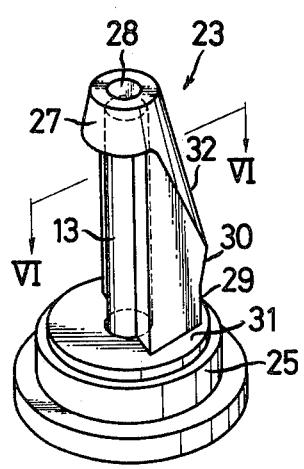
FIG. 5 is a perspective view of the capstan cover.
Figure 6:
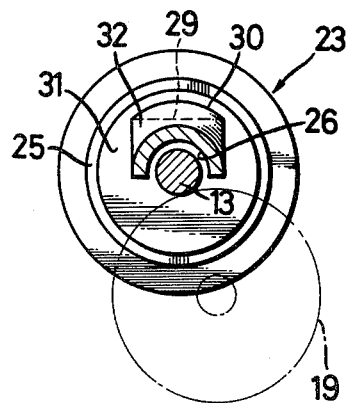
FIG. 6 is a sectional view taken along the line VI — VI of FIG. 5.
Figure 9:
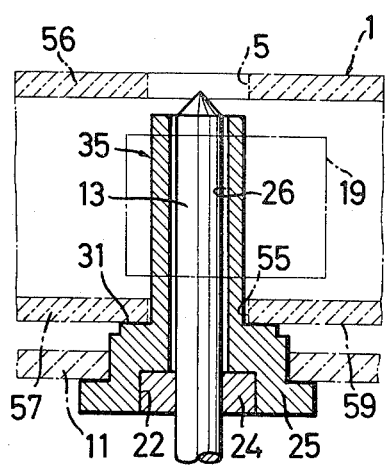
FIG. 9 is a sectional view taken on line IX — IX of FIG. 8.
Figure 10:
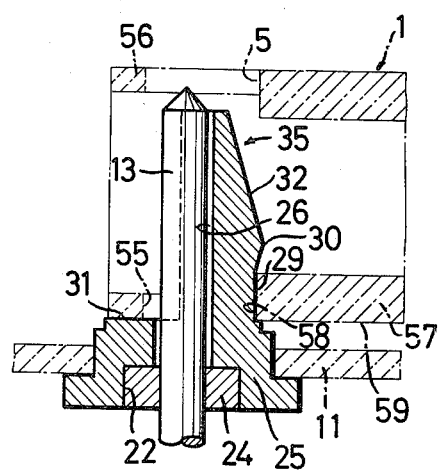
FIG. 10 is a sectional view taken along line X — X of FIG. 8.

FIG. 5 is a perspective view of the capstan cover or holder member 23, and FIG. 6 is a sectional view taken on line VI — VI from FIG. 5.

In operation, the mini-cassette 1 is placed on the machine, and the tapered portion 32 of the capstan cover 23 guides the cassette 1 through the opening 55 and the cassette 1 is pushed downwardly until the surface 58 of the lower plate 57 passes over the projection or bulge 30 and rests firmly down against the surface 31 and the spring 53 holds it firmly against the surface 29. The other opening aligned with the guide pin 14 engages similar surfaces on the cover member 66 which fits about the guide pin 14.

It should be realized that the openings 5 and 55 may be slots rather than enclosed openings. The slots are open at the front end of the cassette 1.

FIGS. 7 through 10 illustrate modifications of the invention, wherein the cylindrical portion 27 has been removed from the cassette cover or holder member 23, as well as the bearing 28. In these Figures, portions similar to those illustrated in FIGS. 1 through 6 are designated by the same numerals. It should be noted that the modified cover 35 extends close to the end of the capstan shaft 13 but does not engage it. Spaces 26 exist between the capstan covers 23 and 35, and the capstan shaft, as shown.

Figure 11:
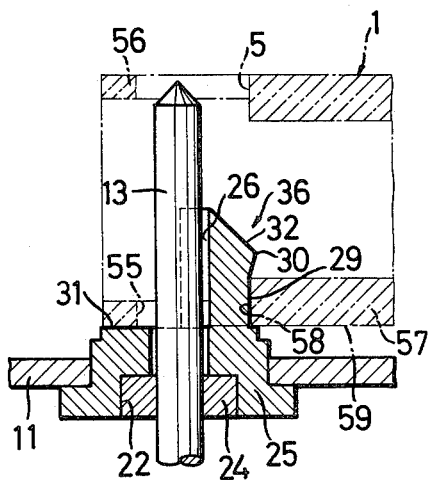
FIG. 11 is a sectional view of a modification of the invention.

FIG. 11 illustrates a further embodiment of the invention, wherein the capstan cover 36 extends substantially less than the full length of the capstan shaft 13 but is formed with a tapered portion 32 and a projection 30 with a pair of reference surfaces 29 and 31, so as to positively position the cassette 1 on the machine.

Figure 12:
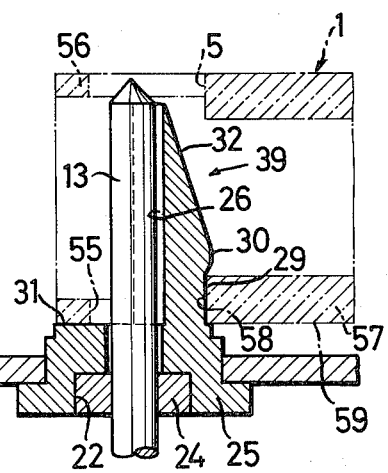
FIG. 12 is a sectional view of a modification of the invention.

FIG. 12 illustrates another modification of the capstan cover 39, wherein the tapered portion 32 comes to an upper point and has a relatively sharp upper portion. The embodiment of FIG. 12 has a projection 30 and the reference surfaces 29 and 31, so as to accurately position the cassette on the machine.

It will be seen that this invention provides an improved capstan cover or holder so as to accurately position a tape cassette on a tape machine, and further provides a means for protecting the tape so as to prevent it from becoming entangled about the capstan.

Although the invention has been described with respect to preferred embodiments, it is not to be so limited, but changes and modifications may be made therein which are within the full intended scope as defined by the appended claims.

What is claimed is:

1. A tape driving assembly for a recording tape contained in a cassette and which is transported past a signal reproducing head, comprising:
  a. a pinch roller;
  b. a capstan mounted adjacent to said pinch roller and operating therewith to transport said tape;
  c. a capstan cover partially surrounding said capstan and having a vertical reference surface against which said cassette is receivable so as to provide a position reference;
  d. means engageable with said cassette to hold it against said vertical reference so as to accurately position said cassette;
    including a horizontal reference surface formed adjacent said capstan cover to form an accurate vertical reference for said cassette; and
    wherein said capstan cover has an upper tapered portion for guiding said cassette.

2. A tape driving assembly according to claim 1, including a projection formed on said capstan cover between said tapered portion and said vertical reference surface to provide a lock to hold said cassette.

3. A tape driving assembly according to claim 2, including an upper bearing attached to the upper tapered end of said capstan cover and the upper end of said capstan rotatably supported by said upper bearing.

4. A tape driving assembly according to claim 3, wherein said horizontal reference surface is integrally formed with said capstan cover.

5. A tape driving assembly for a recording tape contained in a cassette and which is transported past a signal reproducing head, comprising:
  a. a pinch roller;
  b. a capstan mounted adjacent to said pinch roller and operating therewith to transport said tape;
  c. a capstan bearing for supporting said capstan; and
  d. said capstan bearing formed with a planar surface engageable with said cassette so as to accurately position said cassette at the correct height relative to said head and first biasing means holding said cassette in contact with said planar surface.

6. A tape driving assembly according to claim 5, wherein said assembly further includes a capstan cover which prevents said tape from being wound about said capstan accidentally during tape transport.

7. A tape driving assembly according to claim 6, wherein said capstan cover is formed as a unitary body with said capstan bearing.

8. A tape driving assembly according to claim 7 wherein said capstan cover includes a reference semicircular surface which extends at right angles to said planar surface and said cassette has a semicircular surface engageable with said reference semicircular surface and second biasing means holding said cassette against said reference semicircular surface.

9. A tape driving assembly according to claim 8 wherein said second biasing means is a projection formed on said capstan cover adjacent said reference semicircular surface and said first biasing means is a spring means engageable with said cassette.

10. A tape driving assembly according to claim 6, wherein said assembly further includes a radial bearing for said capstan to support it at two points.

* * * * *